United States Patent [19]

Rose et al.

[11] Patent Number: 4,805,885

[45] Date of Patent: Feb. 21, 1989

[54] SINUOUS SPRING

[75] Inventors: William H. Rose, Harrisburg; David W. Rupnik, Mechanicsburg; David T. Shaffer, Harrisburg, all of Pa.

[73] Assignee: AMP Incorporated, Harrisburg, Pa.

[21] Appl. No.: 715,855

[22] Filed: May 29, 1985

Related U.S. Application Data

[60] Division of Ser. No. 610,179, May 14, 1984, Pat. No. 4,531,030, which is a continuation-in-part of Ser. No. 452,002, Dec. 21, 1982, abandoned.

[51] Int. Cl.[4] .......... F16F 1/18

[52] U.S. Cl. .......... 267/165

[58] Field of Search .......... 267/151, 163, 164, 165, 267/103–105, 110, 111, 158, 159; 200/16 C, 16 D, 291; 5/255, 259; 439/68, 71, 72, 74, 75, 817, 818

[56] References Cited

U.S. PATENT DOCUMENTS

| | | | |
|---|---|---|---|
| 1,037,729 | 9/1912 | Collins | 267/165 |
| 1,331,677 | 2/1920 | Schachter | 267/165 X |
| 1,893,098 | 1/1933 | Murray, Sr. et al. | 267/165 X |
| 1,986,259 | 1/1935 | Fischer et al. | 267/165 |
| 2,145,166 | 1/1939 | Douglas | 439/818 |
| 2,154,247 | 4/1939 | Muldoon et al. | 439/817 |
| 3,115,337 | 12/1963 | Musgrave | 267/151 |
| 3,904,262 | 9/1975 | Cutchaw | 439/71 |
| 4,161,346 | 7/1979 | Cherian et al. | 439/66 |
| 4,191,867 | 3/1980 | Feaster | 200/291 X |

OTHER PUBLICATIONS

IBM Tech. Disc. Bull.; H. C. Schick; "Plated Through Hole Contact", vol. 6, No. 10; Mar. 1964, pp. 5 and 6.

*Primary Examiner*—J. R. Scott

*Attorney, Agent, or Firm*—Anton P. Ness; Adrian J. LaRue

[57] ABSTRACT

A spring for a switch actuating assembly is of generally E-shape or sinuous configuration wherein inwardly-curved free ends of outer sections are adapted to engage the legs of a central U-shape section when the spring member is compressed, thereby limiting the movement of the outer sections and increasing the spring characteristics of the spring member. The spring can be disposed in a slide member in a housing and be movable from one selected position to another so that the spring moves a movable contact member from an electrically connected condition to a disconnected condition.

2 Claims, 5 Drawing Sheets

SINUOUS SPRING

CROSS-REFERENCE TO RELATED APPLICATIONS

This is a division of application Ser. No. 610,179, filed May 14, 1984, which is a continuation-in-part of application Ser. No. 452,002, filed Dec. 21, 1982, now abandoned.

FIELD OF THE INVENTION

This invention relates to an electrical switch and more particularly to an electrical switch and actuating mechanism therefor for use with an electrical contact assembly or for operating a movable member.

BACKGROUND OF THE INVENTION

Electrical switches of the dual in-line package (DIP) type are extensively used, especially on printed circuit boards. Some of these switches are of a size so as to conform to the size of DIP integrated circuits so that they can be automatically inserted by automatic application machinery into selected positions on printed circuit boards. Such switches must also have contact assemblies that will not be affected when the printed circuit boards on which they are mounted are flow soldered. The parts of these DIP switches must be structured so as to be readily assembled into DIP switches.

SUMMARY OF THE INVENTION

According to the present invention, an electrical switch comprises an electrical contact assembly which includes a dielectric frame in which a series of aligned stationary contact members are disposed. Electrical contact sections of the stationary contact members are exposed in recesses in a top surface of the dielectric frame. A movable electrical contact member is pivotally mounted on one of the contact sections in each of the recesses to electrically connect the stationary contact sections in one position and to disconnect the contact sections in another position. A housing is latchably secured onto the dielectric frame and has linearly-movable actuating members mounted therein in operative association with respective movable contact members. Each of the linearly-movable actuating members comprises a slide member in which a spring is disposed. The slide member is movable to one position in the housing so that the spring moves the movable contact member to the one position electrically connecting the stationary contact sections and the spring and the housing maintain the slide member in this one position. The slide member is movable to another position in the housing so that the spring moves the movable contact member to another position disconnecting the stationary contact sections and the spring and the housing maintain the slide member in this other position.

According to another embodiment of the present invention, a membrane sealingly covers the recesses and the exposed contact sections along with the respective movable contact members therein thereby forming a sealed electrical contact assembly.

According to a further embodiment of the present invention, the spring member as part of a switch actuating assembly is of generally E-shape or sinuous configuration wherein inwardly-curved free ends of outer sections are adapted to engage the legs of a central U-shape section when the spring member is compressed to the condition at which the free ends engage the central section legs thereby limiting the movement of the outer sections and increasing the spring characteristics of the spring member.

DETAILED DESCRIPTION OF THE PREFERRED EMBODIMENT

Figure 1:
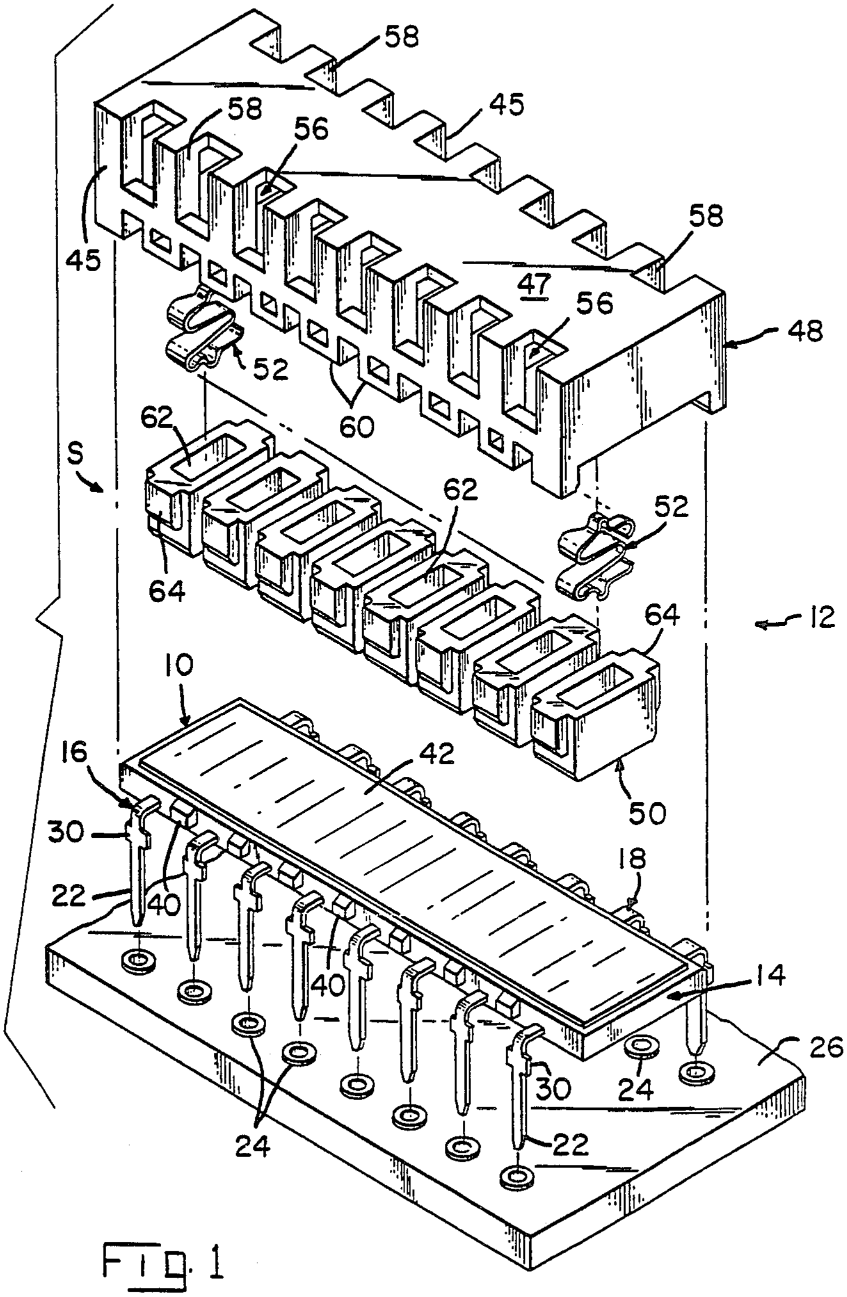
FIG. 1 is a perspective and exploded view of parts of an electrical switch.
Figure 2:
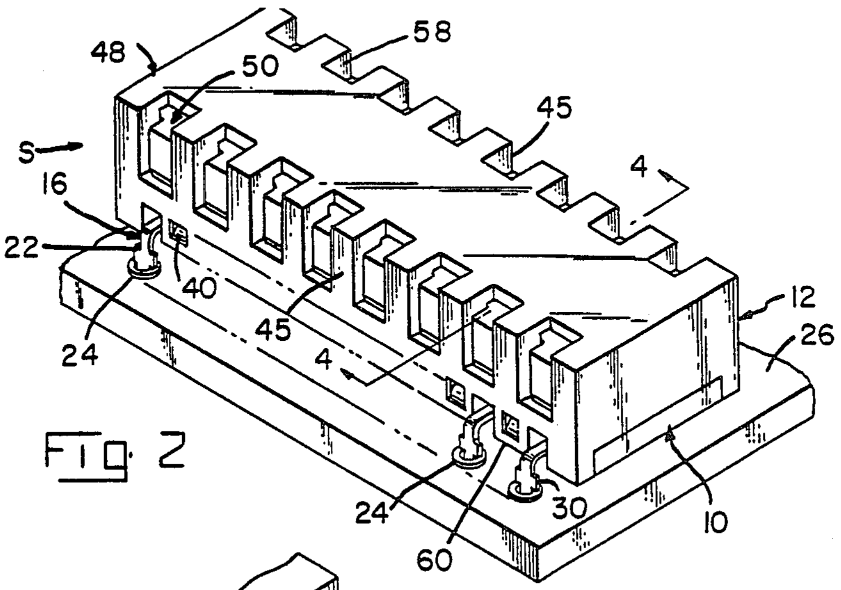
FIG. 2 is a perspective view of the assembled switch.

FIGS. 1 through 4 illustrate the sealed electrical contact assembly 10 and the contact-actuating mechanism 12 that is latchably secured thereto thereby forming DIP switch S as illustrated in FIGS. 1 and 2.

Figure 4:
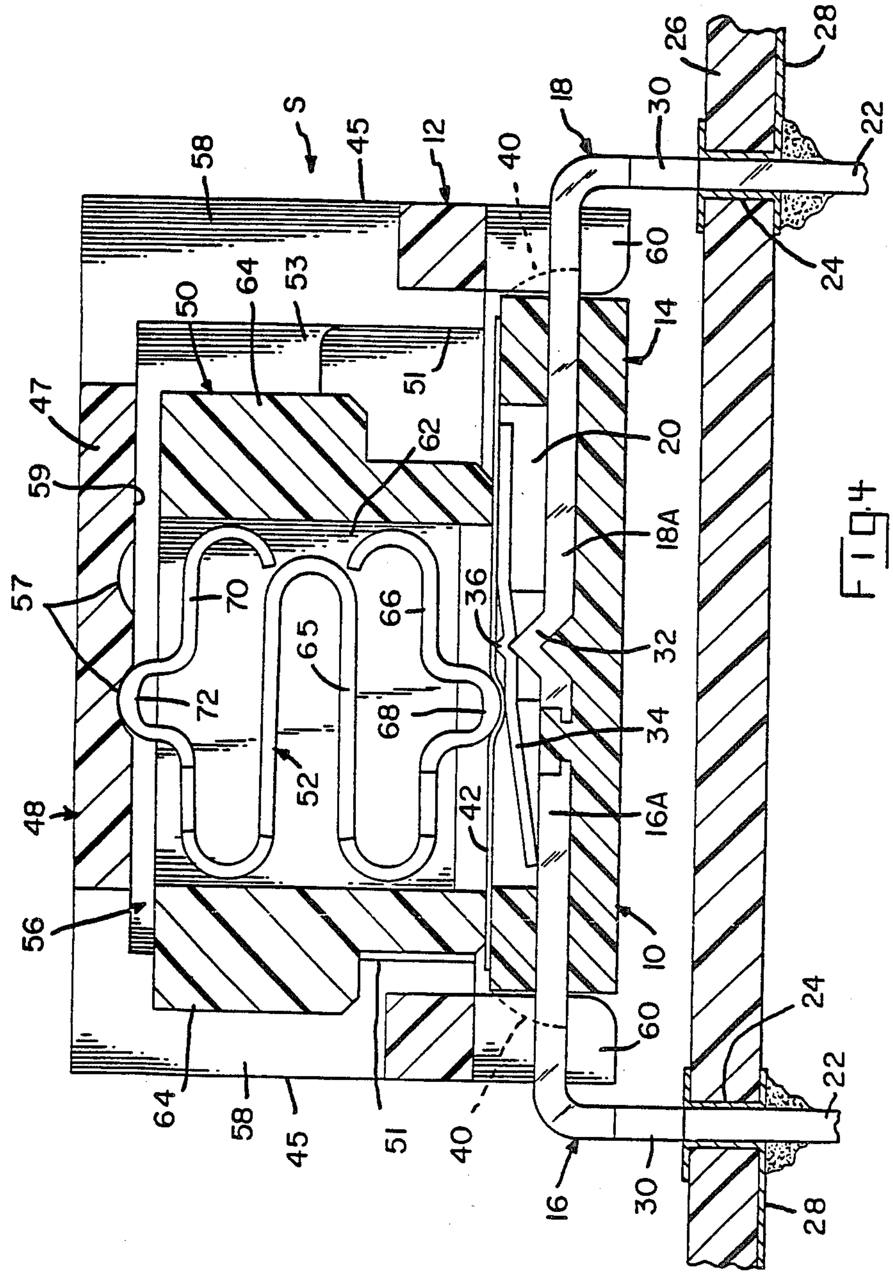
FIG. 4 is a cross-sectional view taken along line 4—4 of FIG. 2.

Sealed electrical contact assembly 10 is completely disclosed in U.S. Pat. No. 4,417,106 which is completely incorporated by reference herein. Dielectric frame 14 is molded from a suitable commercially-available plastic material and, as shown in FIG. 4, it has a series of aligned electrical contact members 16, 18 molded in place therein. Electrical contact members 16, 18 are arranged in dielectric frame 14 having opposed and aligned stationary electrical contact sections 16A, 18A which are exposed in recesses 20 in the top surface of frame 14 and spaced from each other thereby. Each of electrical contact members 16, 18 has an electrical terminal section 22 extending outwardly from frame 14 for electrical connection with electrical holes 24 disposed in proper alignment in printed circuit board 26 with electrical holes 24 electrically connected to appropriate circuit paths 28 located thereon. Electrical terminal sections 22 are provided with projections 30 to limit the movement of electrical terminal sections 22 within holes 24 in order to space switch S from board 26. Electrical contact members 18 are provided with upwardly-directed pivot members 32 that have been stamped therefrom.

Electrical contact members 16, 18 are stamped and formed from suitable metal stock in lead frame form. The lead frame acts as a carrier to carry the contact members into position in a mold enabling dielectric frames 14 to be molded thereon. These assemblies can then be carried to other assembly locations to form completed switches as disclosed in U.S. Pat. No. 4,417,106.

Movable electrical contact members 34 have V-shaped embossments 36 formed therein which mate with pivot members 32 and the ends are provided with contact fingers to provide contact redundancy when movable contact members 34 are moved into electrical contact with stationary contact sections 16A as illustrated in FIG. 4. V-shaped embossments 36 in engagement with pivot members 32 positively position movable contact members 34 relative to the respective sets of stationary contact sections 16A, 18A within recesses 20. Latching lugs 40 having upper beveled surfaces extend outwardly from the sides of frame 14 between terminal sections 22.

Membrane 42 of a commercially-available plastic material is sealingly secured on the top surface of frame 14 by a commercially-available adhesive material. Membrane 42 covers all of recesses 20 with movable contact members 34 pivotally mounted on pivot members 32 of electrical contact sections 18A. Another membrane can be adhesively secured onto a bottom surface of frame 42 if holes are formed in frame 14 by the use of hold-down members. As can be discerned, membrane 42 not only maintains movable contact members 34 in position in recesses 20 and on pivot members 32 of stationary contact sections 18A, but membrane 42 also seals electrical contact assembly 10 from contaminants, especially during the flow soldering and cleaning operations to which the contact assembly will be subjected and during the operating life thereof. While a membrane has been disclosed to cover the bottom surface of frame 14 to cover holes therein, frame 14 can be molded as shown without holes therein thereby eliminating the bottom membrane and using only membrane 42 adhered to the top surface of frame 14, if desired.

Contact-actuating mechanism 12 includes housing 48, slide members 50, and springs 52. Housing 48 and slide members 50 are molded from a commercially-available plastic material.

Housing 48 has separate cavities 56 which receive therein contact-actuating members comprising slide members 50 and springs 52 therein as illustrated in FIG. 4. Openings 58 are located in sidewalls 45 of housing 48 and terminate in top wall 47 of housing 48; opposing openings 58 communicate with respective cavities 56. Latches 60 extend outwardly from the bottom surface of housing 48 to mate with latching lugs 40 on frame 14 to latchably secure housing member 48 onto frame 14 with the contact-actuating members in position in cavities 56 thereby forming switch S as illustrated in FIGS. 2 and 4.

Each of cavities 56 is bounded by inner surfaces 51 of sidewalls 45 and inner surface 59 of top wall 47. Dividers 53 extend downwardly from top wall 47 and along sidewalls 45 to about midway thereof. Spaced arcuate recesses 57 are located on an inner surface 59 of top wall 47 in each of cavities 56.

Slide members 50 have rectangular openings 62 extending therethrough and projections 64 extending outwardly from end walls of the slide members 50. Thus, slide members 50 fit within respective cavities 56 and with springs 52 in openings 62 are slidably movable therein when housing 48 is latchably mounted on contact assembly 10. Projections 64 are positioned in openings 58 depending on the position slide members 50 have been moved to.

Figure 3:
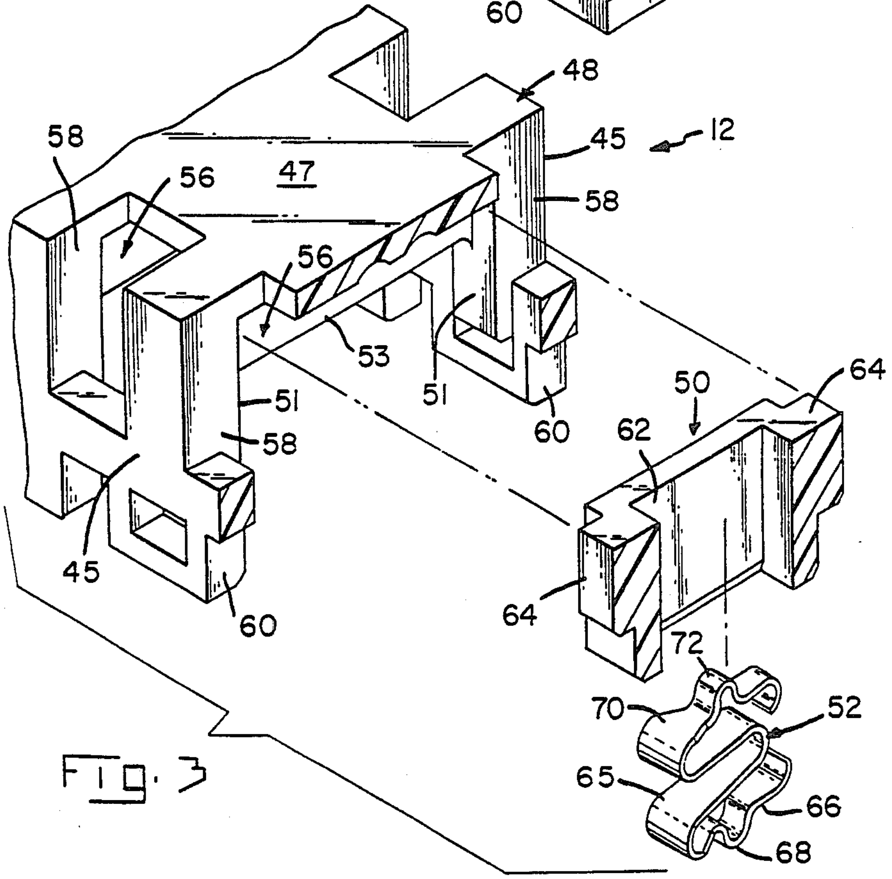
FIG. 3 is a perspective and exploded view with parts in cross section of the housing and the slide member.

Each of springs 52 is stamped and formed from suitable metal stock having the necessary spring characteristics and has a generally E-shape or sinuous configuration with upper and bottom legs 74,76 respectively extending from first bight section 78. A central section 65 of springs 52 has a U-shape configuration. Contact-actuating section 66 extends in cantilever fashion from a second bight section 80 joined to bottom leg 76 and generally parallel thereto and includes an arcuate section 68 about midway therealong detent section 70 extends in cantilever fashion from a second bight section 82 joined to upper leg 74 and includes an arcuate section 72 about midway therealong. Free ends 84, 86 of sections 66 and 70 are curved inwardly toward bright section 78 of central section 65. As shown in FIG. 3, sections 66 and 70 along which arcuate sections 68 and 72 are located are narrower. The widths of central section 65, the ends of sections 66 and 70 are the same and are just slightly less than the widths of openings 62 in slide members 50 to enable springs 52 to freely move within openings 62 and to stabilize their movements therein as slide members 50 move back and forth in respective cavities 56 of housing 48. Arcuate sections 68 and 72 extend outwardly from contact-actuating section 66 and detent section 70 respectively and outwardly from the top and bottom surfaces of slide members 50.

The bottom inside edges of the sides of openings 62 are beveled to facilitate insertion of springs 52 into openings 62 of slide members 50 when slide members 50 are in position in cavities 56 of housings 48 in their inverted positions during the assembling of the sealed contact assemblies 10 to housings 48 to form the switches. After contact assemblies 10 have been made but are still attached to their carrier strips as disclosed in U.S. Pat. No. 4,417,106, they are latched onto respective housings 48, terminal sections 22 are sheared from their carrier strips along with sections connecting the terminal sections together between projections 30 whereafter terminal sections 22 are bent to their appropriate angle for insertion into holes 24 of board 26. The board can now be subjected to a flow soldering operation to solder the terminal sections to the holes and the sealed contact assembly is protected from being contaminated during and after such operation. If desired, sockets can be disposed in holes 24 and soldered thereto so that terminal sections 22 can be electrically connected thereto.

As can be discerned, the nature of the parts of the switches lends them to automatic assembling practices that enables the manufacture of the switches to be substantially increased.

As shown in FIG. 4, slide member 50 is in a contact-operated position with arcuate section 68 maintaining movable contact 34 in electrical engagement with contact section 16A through membrane 42 and arcuate section 72 is disposed in the left-handed recess 57. The spring characteristics of sections 65, 66 and 70 of spring 52 coupled with the detent arrangement of arcuate section 72 in recess 57 and arcuate section 68 located on the left side of embossment 36 maintain slide member 50 in this contact-operated position.

A probe (not shown) is used to engage the left projection 64 through opening 58 and pushes slide member 50 toward the right within cavity 56 of housing 48. This causes arcuate sections 68 and 72 to move inwardly against the spring forces of sections 65, 66 and 70 of spring 52. Arcuate section 68 slides along membrane 42, the left side of movable contact member 34, over embossment 36 and onto the right side of contact member 34 which moves the left side of contact member 34 out of electrical engagement with contact section 16A thereby disconnecting contact sections 16A, 18A. Arcuate section 72 is moved into right recess 57 and this detent arrangement under the spring forces of spring 52 coupled with arcuate section 68 being on the right side of embossment 36 maintains slide member 50 in the non-contact-operated position.

If the force exerted by the probe on slide member 50 is not enough to move the center of arcuate section 68 beyond the center of embossment 36, slide member 50 will move back to its original position. If the operating force exerted by the probe is sufficient to move arcuate section 68 beyond the center of arcuate section 68, the configuration of embossment 36 on pivot member 32 and that of arcuate section 68 plus the action of spring 52 will move slide member 50 to the position opposite to where it was located thereby providing snap action operation. The fingers of movable contact members 34 are wipingly moved along stationary contact section 16A because of the downwardly bent orientation of the movable contact members that begins at a location spaced outwardly from embossments 36.

Figure 5:
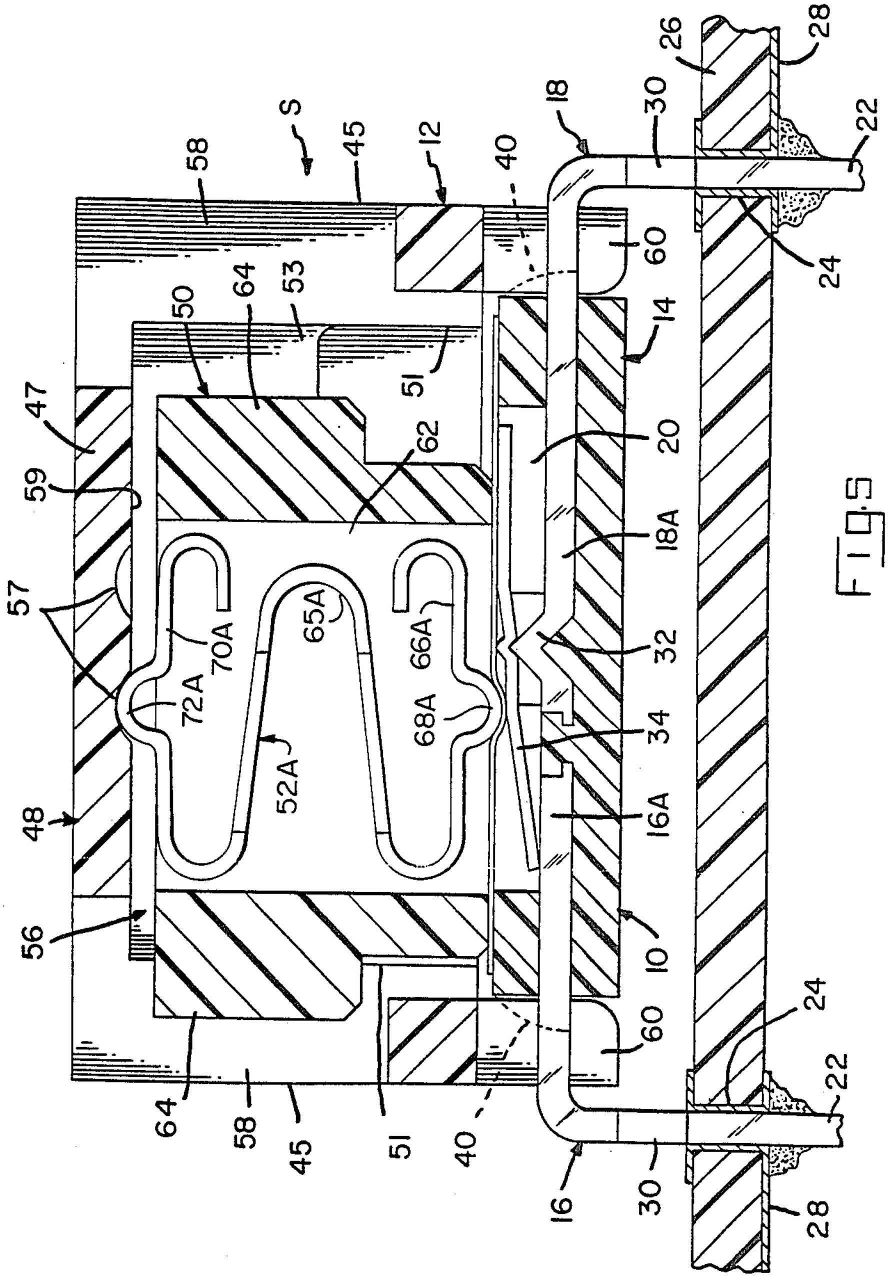
FIG. 5 is a view similar to FIG. 4 showing an alternative embodiment.
Figure 6:
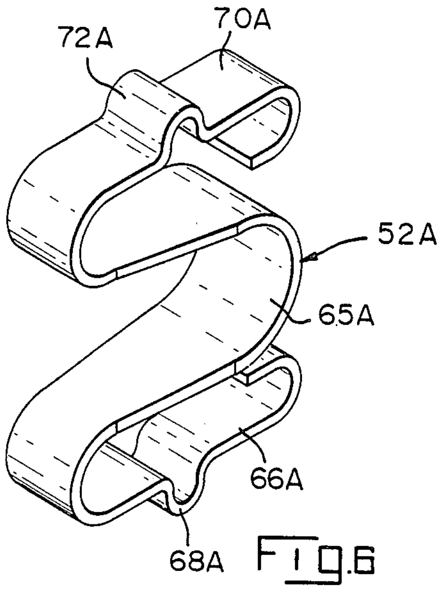
FIG. 6 is a perspective view of an alternative embodiment of the spring member.
Figure 7:
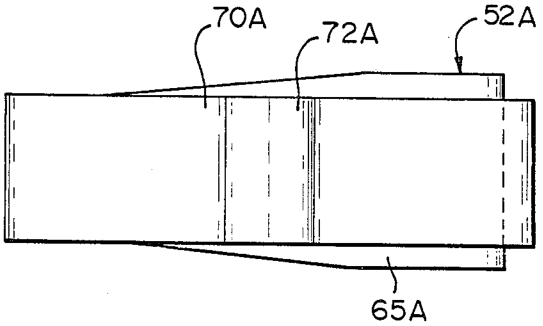
FIG. 7 is a top plan view of FIG. 6.

FIGS. 5 through 7 illustrate an alternative embodiment of the switch with particular reference to spring 52A. Free ends 84A, 86A of sections 66A and 70A are curved inwardly so as to have end sections 88A, 90A which extend along and have major surfaces 92A, 94A facing opposed portions 96A, 98A of respective legs 76A, 74A of U-shaped central section 65A adjacent the junctures of legs 76A, 74A with first bight section 78A thereof. As shown in FIG. 7, the width of central section 65A from bight section 78A to just forward of arcuate sections 68A, 72A is of uniform width and is wider than sections 66A and 70A which are of the same width. Central section 65A then tapers to a position adjacent the outer ends of legs 74A, 76A of central section 65A which merge into bights of sections 66A, 70A. This wider central section allows the stresses of spring 52A to be more evenly distributed thereover. The general E-shape or sinuous configuration of the spring accommodates wide tolerance variations so as to evenly distribute the stresses over the spring to make the most efficient use of the spring material and closely approximate the operation of a coil spring.

Springs 52A as shown in FIG. 5 are disposed in rectangular openings 62 of slide members 50 and are freely movable therein. Slide members 50 with springs 52A therein are positioned in respective cavities 56 of housing 48 which is in a position so that contact assembly 10 is latched onto contact-actuating mechanism 12. When this is done, springs 52A are compressed so that arcuate sections 68A are engaging membrane 42 and respective movable contact members 34 thereunder on either side of embossments 36 with arcuate sections being disposed in one of recesses 57. This will maintain movable contact members 34 in one or the other position.

When sliders 50 are moved from one position to another to either move movable contact members 34 from an actuated position bridging contact sections 16A, 18A, to a non-actuated position in which contact section 16A, 18A are not bridged, arcuate sections 68A move along membrane 42 and respective movable contact members 34 and arcuate sections 72A move out of recesses 57 in which they were disposed causing the free ends of sections 70A to engage the respective legs of central sections 65A translating the spring forces to central sections 65A and preventing sections 70A from being overstressed. Thus, springs 52, 52A are always in a compressed condition to thereby maintain movable contact members 34 in either an actuated or non-actuated position.

Whereas the free ends of sections 66, 70 of spring 52 are not curved in as much as the free ends of sections 66A, 70A of spring 52A, the free ends of sections 66, 70 of spring 52 will engage the bight of central section 65 and operate in the same manner as spring 52A. Otherwise, the embodiment of FIGS. 5 through 7 operates in the same manner as that of FIGS. 1 through 4.

The construction of DIP switch S with membrane 42 in sealed engagement with the top surface of frame 14 or with membranes in sealed engagement with the top and bottom surfaces of frame 14 provides a DIP switch having a sealed electrical contact assembly that will protect the contact assembly from contaminants when the board 26 is subjected to conventional flow soldering and cleaning operations as well as during the normal operating life of the switch. This eliminates the need to remove a tape seal which is currently used to protect switches during wave soldering operations. The sealed DIP switch S is also smaller in all dimensions than existing DIP switches thereby enabling it to be used in greater density at a lower profile. Switches S can be packaged in tubes in the manner of integrated circuits and subjected to automated insertion equipment. The construction of switch S minimizes parts, molds to make them, and inventory. Switches S can readily be manufactured in accordance with the disclosure of U.S. Pat. No. 4,417,106.

We claim:

1. A sinuous spring member for compression to a loaded state and relaxable to a substantially unloaded state, comprising:

a central section of U-shaped configuration having a first bight section and two legs extending from said first bight section;

outer sections extending integrally and continuously from second bight sections joining respective ones of said two legs, first outwardly therefrom then therealong and including outwardly arcuate sections about midway thereof to receive compressive force thereat, said outer sections thereby being adapted to be deflected in cantilever fashion about said second bight sections; and free ends of said outer sections being curved inwardly to have end sections parallel to and having major surfaces facing opposing portions of said respective ones of said two legs adjacent the juncture of said legs and said first bight section, said end sections thereby being adapted to engage said opposing portions with said major surfaces and not damage said central section upon engagement when the spring member is compressed to said loaded state, whereby the inward movement of said outer sections is limited and the spring characteristics of the spring member are increased when said major surfaces of said end sections so engage said opposing portions.

2. A sinuous spring member as set forth in claim 1 wherein said bight section of said central section is wider than said two legs and said outer sections.

* * * * *